United States Patent
Hvidsten (10) Patent No.: US 12,277,949 B2
(45) Date of Patent: Apr. 15, 2025

(54) METHOD AND AUDIO PROCESSING DEVICE FOR VOICE ANONYMIZATION

(71) Applicant: PEXIP AS, Oslo (NO)

(72) Inventor: Knut Inge Hvidsten, Oslo (NO)

(73) Assignee: PEXIP AS, Oslo (NO)

( * ) Notice: Subject to any disclaimer, the term of this patent is extended or adjusted under 35 U.S.C. 154(b) by 16 days.

(21) Appl. No.: 18/342,025

(22) Filed: Jun. 27, 2023

(65) Prior Publication Data

US 2024/0005936 A1 Jan. 4, 2024

(30) Foreign Application Priority Data

Jul. 1, 2022 (NO) .................................. 20220759

(51) Int. Cl.
*G10L 21/013* (2013.01)
*H04L 12/18* (2006.01)

(52) U.S. Cl.
CPC ........ *G10L 21/013* (2013.01); *H04L 12/1831* (2013.01); *G10L 2021/0135* (2013.01)

(58) Field of Classification Search
CPC ...................... G10L 21/013; G10L 2021/0135
See application file for complete search history.

(56) References Cited

U.S. PATENT DOCUMENTS 8,892,448 B2 * 11/2014 Vos ..................... G10L 19/0208
704/223
10,432,687 B1 * 10/2019 Hanes ................. H04L 65/1083
2005/0249272 A1 * 11/2005 Kirkeby .................. G10L 21/02
375/232
2021/0089626 A1 * 3/2021 Ross ..................... G10L 19/125
2021/0400142 A1 12/2021 Jorasch et al.

(Continued)

FOREIGN PATENT DOCUMENTS

WO 2021152566 A1 8/2021

OTHER PUBLICATIONS

Patino, J., Tomashenko, N., Todisco, M., Nautsch, A., & Evans, N. (2020). Speaker anonymisation using the McAdams coefficient. arXiv preprint arXiv:2011.01130.*

(Continued)

*Primary Examiner* — Bryan S Blankenagel
(74) *Attorney, Agent, or Firm* — Leech Tishman Fuscaldo & Lampl, LLC (57) ABSTRACT

A method and audio processing device for voice anonymization in an audio- or videoconferencing session. The method comprises receiving a plurality of input audio samples comprising speech, calculating a frequency spectrum of each the plurality of input audio samples, calculating a smoothed spectral magnitude envelope of a first of the plurality of frequency spectrums to determine a plurality of formant features of the speech, each of the plurality of formant features being located at different frequencies in the frequency spectrum, determining one random scaling factor for the audio- or videoconferencing session, determining, based on the one random scaling factor, a voice anonymization function shifting the formant location of at least one of the plurality of formants, and applying the voice anonymization function on the frequency spectrum of each the subsequent plurality of input audio samples in the audio- or videoconferencing session.

11 Claims, 8 Drawing Sheets

(56) References Cited

U.S. PATENT DOCUMENTS

2023/0351059 A1\* 11/2023 Springer ............ H04L 12/1831

OTHER PUBLICATIONS

Jose Patino et al., Speaker anonymisation using the McAdams coefficient, arxiv.org, Cornell University Library, 201, Sep. 1, 2021, 5-pages.
Kai Hiroto et al., Lightweight Voice Anonymization Based on Data-Driven Optimization of Cascaded Voice Modification Modules, Tokyo Metropolitan University, 2021, 7-pages.
Lal Srivastava Brij Mohan et al., Evaluating Voice Conversion-Based Privacy Protection Against Informed Attackers, 2020 IEEE, 5 pages.
European Patent Office, International-Type Search Report for corresponding Norwegian Application No. 20220759, dated Feb. 2, 2023, 14-pages.
Norwegian Search Report for corresponding Norwegian Application No. 20220759, dated Jan. 26, 2023, 2-pages.

\* cited by examiner

METHOD AND AUDIO PROCESSING DEVICE FOR VOICE ANONYMIZATION

CROSS-REFERENCE TO RELATED APPLICATION

This application is related to and claims priority to Norwegian Patent Application No. 20220759, filed Jul. 1, 2022, the entirety of which is incorporated herein by reference.

FIELD

The present invention relates to voice anonymization in an audio- or videoconferencing session, in particular a method of voice anonymization and an audio processing device to perform the method. The audio processing device may be implemented in a Multipoint Conferencing Node (MCN).

BACKGROUND

Transmission of audio and moving pictures in real-time is employed in several applications like e.g. video conferencing, team collaboration software, net meetings and video telephony. Terminals and endpoints being able to participate in a conference may be traditional stationary video conferencing endpoints, external devices, such as mobile and computer devices, smartphones, tablets, personal devices and PCs, and browser-based video conferencing terminals.

Video conferencing systems allow for simultaneous exchange of audio, video and data information among multiple conferencing sites. For performing multipoint video conferencing, there usually is a Multipoint Conferencing Node (MCN) that provides switching and layout functions to allow the endpoints and terminals of multiple sites to intercommunicate in a conference. Such nodes may also be referred to as Multipoint Control Units (MCUs), Multi Control Infrastructure (MCI), Conference Nodes and Collaborations Nodes (CNs). MCU is the most commonly used term, and has traditionally has been associated with hardware dedicated to the purpose, however, the functions of an MCN could just as well be implemented in software installed on general purpose servers and computers, so in the following, all kinds of nodes, devices and software implementing features, services and functions providing switching and layout functions to allow the endpoints and terminals of multiple sites to intercommunicate in a conference, including (but not excluding) MCUs, MCIs and CNs are from now on referred to as MCNs.

The MCN links sites, endpoints and participants together by receiving conference signals from the sites/endpoints, processing the received signals, and transmitting the processed signals to appropriate sites/endpoints. The conference signals include audio, video, data and control information. The MCN processes the received conference signals from one or more sites/endpoints based on the requirements/capabilities of each site/endpoint receiving signals from the MCN.

Figure 1:
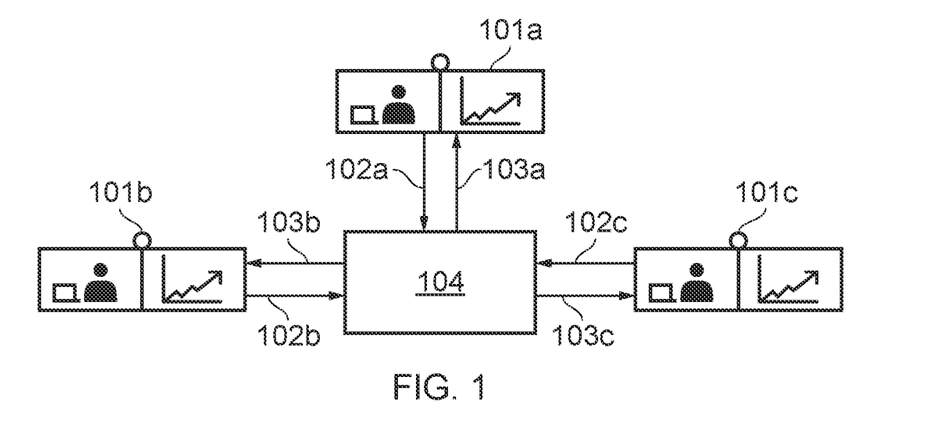
FIG. 1 is a schematic illustration of a multi-point video-conferencing system.

FIG. 1 schematically illustrates multi-point videoconferencing system 100 with three videoconferencing endpoints 101a, 101b, 101c in communication with a multipoint conferencing node (MCN) 104. In the multi-point videoconferencing system 100 all media passes through the MCN 104. Input audio 102a, 102b, 102c captured at the videoconferencing endpoints 101a, 101b, 101c is transmitted to the MCU 104, then the input audio 102a, 102b, 102c is mixed with audio from the other videoconferencing endpoints 101a, 101b, 101c, and output audio 103a, 103b, 103c is transmitted back out to the videoconferencing endpoints 101a, 101b, 101c.

A transcoding MCN comprises a plurality of encoders that may translate signals from one video or audio codec to another codec, change picture size, change video quality, change audio quality, change bitrate, combine conference signals from multiple participants into various layouts etc.

Multipoint videoconferencing technology is used for virtual or virtual-physical hybrid courts. One challenge is that it may be required to anonymize participants, such as witnesses, a jury, a judge towards a defendant, the defendants attorney, or the general public. In physical trials one can employ one-way mirrors, hoods, speech distortion devices, concealment of names, or escorting the defendant from the court when a sensitive witness is to testify. In virtual or virtual-physical hybrid courts video may be stopped such that the visual anonymization is achieved, however, voice anonymization is still required.

For a high degree of anonymization, one may take a written statement, rephrase the text, then have a voice actor read the statement. This comes at considerable cost in manual effort, and the loss of efficient two-way communication, as well as lost non-lingual information such as emotional state that could be critical in establishing the credibility of the speaker. One could automate this process using speech-to-text, text processing, followed by text-to-speech algorithms to reduce manual labor, but the other drawbacks still remain. Furthermore, speech-to-text failing to recognize the true spoken text may pose a significant challenge. E.g. the two following phrases may sound similar, but they have completely opposite meanings. "I did see the defendant in the back alley" vs "I didn't see the defendant in the back alley". Common real time speech distortion devices remove non-lingual information, whereas more advanced speech distortion methodologies used for example in documentaries is performed by post-processing of recorded audio and have high computational complexity.

For efficient proceedings in virtual or virtual-physical hybrid courts, one is willing to accept a moderate degree of anonymization. By moderate degree of anonymization, it is taken that if the listener has a known list of only two participants that he/she knows really well, listening to 30 minutes of testimony, it would not be able to conceal the identity to the listener. However, if that list is increased to 50 people and/or the listener is not familiar with their voice and do not have readily access to known speech samples, it makes the task of identifying the speaker significantly harder. That should be the case even if the listener has detailed knowledge of the voice anonymization technology, such as source code and/or the detailed description herein.

A related field is speaker anonymization or de-identification of raw audio collected by smart devices, transmitted to the cloud for speech recognition inference or training using voice conversion. Data protection regulations has led to efforts to remove speaker-related information before transmission to a cloud back-end, while still retaining audio features related to linguistic content. As measured using automated algorithms for speaker identification as well as speech recognition, significant reduction in speaker identification is possible with such methods while maintaining good speech recognition accuracy, however this is achieved at the cost of significant compute and/or latency.

There is a need for as audio processing device and method for voice anonymization that is capable of interactive real time communication, while keeping non-lingual information, and is resource efficient, such that it can run on a general-purpose CPU.

SUMMARY

In view of the above, an object of the present invention is to overcome or at least mitigate drawbacks of prior art video conferencing systems.

A first aspect the invention provides a method for voice anonymization in an audio- or videoconferencing session, the method comprising:
  receiving an plurality of input audio samples comprising speech:
  calculating a frequency spectrum of each the plurality of input audio samples;
  calculating a smoothed spectral magnitude envelope of a first of the plurality of frequency spectrums to determine a plurality of formant features of the speech, each of the plurality of formant features being located at different frequencies in the frequency spectrum;
  determining one random scaling factor for the audio- or videoconferencing session;
  determining, based on the one random scaling factor, a voice anonymization function shifting the formant location of at least one of the plurality of formants; and
  applying the voice anonymization function on the frequency spectrum of each the subsequent plurality of input audio samples in the audio- or videoconferencing session.

An advantage of the first aspect of the invention is that it provides a method for voice anonymization that is capable of interactive real time communication, that keeps non-lingual information while anonymizing the speaker, and with sufficient security against an attacker wanting to invert the voice anonymization.

In one embodiment, the method may comprise determining the one random scaling factor by using a random function to pick a number from two or more ranges of scaling factors.

In one embodiment, the voice anonymization function may be a linear segment warping function performing linear scaling in the range 0-4 kHz.

In one embodiment, the voice anonymization function may be tapering off to zero warp at one half of a sampling frequency.

In one embodiment, the method may comprise determining a plurality of frequency gains for the voice anonymization function by calculating a ratio between the smoothed spectral magnitude envelope and a spectral magnitude envelope of the voice anonymization function applied on the smoothed spectral magnitude envelope.

In one embodiment, the calculating of the frequency spectrum of each of the plurality of input samples may be performed by a filterbank. The filterbank may be a Short-Time Fourier Transform filterbank.

One advantage of using a filterbank, is that the speech anonymization can easily be integrated with other common speech processing tasks, such as noise reduction, echo cancellation etc., adding no additional algorithmic delay and low computational complexity. By working only on the spectral magnitude envelope rather than the full, complex, spectrum, the complexity of maintaining phase coherence between time frames is avoided. Further, by avoiding pitch-synchronous processing, the complexity and poor reliability of pitch estimation is also avoided.

Traditional LPC processing is often restricted to narrow-band audio, fullband LPC requires a larger number of coefficients and/or warping. This invention is suitable for wide-band (20 kHz bandwidth) audio.

A second aspect of the invention provides an audio processing device for an audio- or videoconferencing session, the audio processing device being adapted to:
  receiving an plurality of input audio samples comprising speech:
  calculating a frequency spectrum of each the plurality of input audio samples;
  calculating a smoothed spectral magnitude envelope of a first of the plurality of frequency spectrums to determine a plurality of formant features of the speech, each of the plurality of formant features being located at different frequencies in the frequency spectrum;
  determining one random scaling factor for the audio- or videoconferencing session;
  determining, based on the one random scaling factor, a voice anonymization function shifting the formant location of at least one of the plurality of formants; and
  applying the voice anonymization function on the frequency spectrum of each the subsequent plurality of input audio samples in the audio- or videoconferencing session.

In one embodiment, the audio processing device may be determining the one random scaling factor by using a random function to pick a number from two or more ranges of scaling factors.

In one embodiment, the voice anonymization function may be a linear segment warping function performing linear scaling in the range 0-4 kHz.

In one embodiment, the voice anonymization function may be tapering off to zero warp at one half of a sampling frequency.

In one embodiment, the audio processing device may be determining a plurality of frequency gains for the voice anonymization function by calculating a ratio between the smoothed spectral magnitude envelope and a spectral magnitude envelope of the voice anonymization function applied on the smoothed spectral magnitude envelope.

In one embodiment, the audio processing device may be comprising a filterbank adapted to calculating the frequency spectrum of each of the plurality of input samples. The filterbank may be a Short-Time Fourier Transform filterbank.

In one embodiment, the audio processing device may be integrated in at least one of a multipoint conferencing node, MCN, and a videoconferencing terminal.

The second aspect of the invention has the same advantages as mentioned above for the first aspect.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

According to embodiments of the present invention as disclosed herein, the above-mentioned disadvantages of solutions according to prior art are eliminated or at least mitigated.

FIG. 1 schematically illustrates multi-point videoconferencing system 100 with three videoconferencing endpoints 101*a*, 101*b*, 101*c* in communication with a multipoint conferencing node (MCN) 104. In the multi-point videoconferencing system 100 all media passes through the MCN 104. Input audio 102*a*, 102*b*, 102*c* captured at the videoconferencing endpoints 101*a*, 101*b*, 101*c* is transmitted to the MCU 104, then the input audio 102*a*, 102*b*, 102*c* is mixed with audio from the other videoconferencing endpoints 101*a*, 101*b*, 101*c*, and output audio 103*a*, 103*b*, 103*c* is transmitted back out to the videoconferencing endpoints 101*a*, 101*b*, 101*c*.

Figure 2:
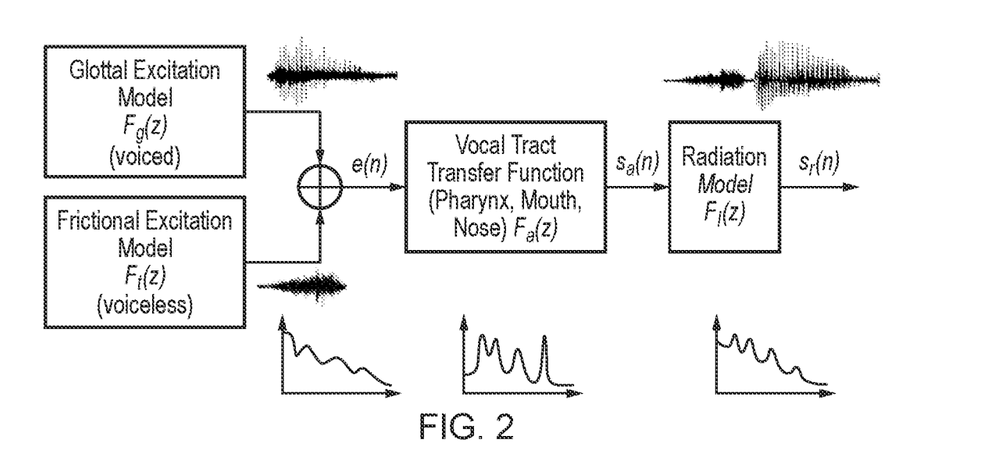
FIG. 2 is a schematic illustration of a source-filter model of speech generation.

FIG. 2 schematically illustrates the Source-filter model of speech generation by Fant, where the acoustic elements of speech generation is simplified as voiced (periodic) or frictional (noise-like) sound source, followed by linear filtering carried out by the vocal tract and radiation. Acoustic features that correlate with the physical characteristics of the speaker, e.g. the fundamental frequency of voiced sounds, frequency location of formants, are associated with speaker identity, but also used dynamically to convey linguistic and non-linguistic information.

Figure 3:
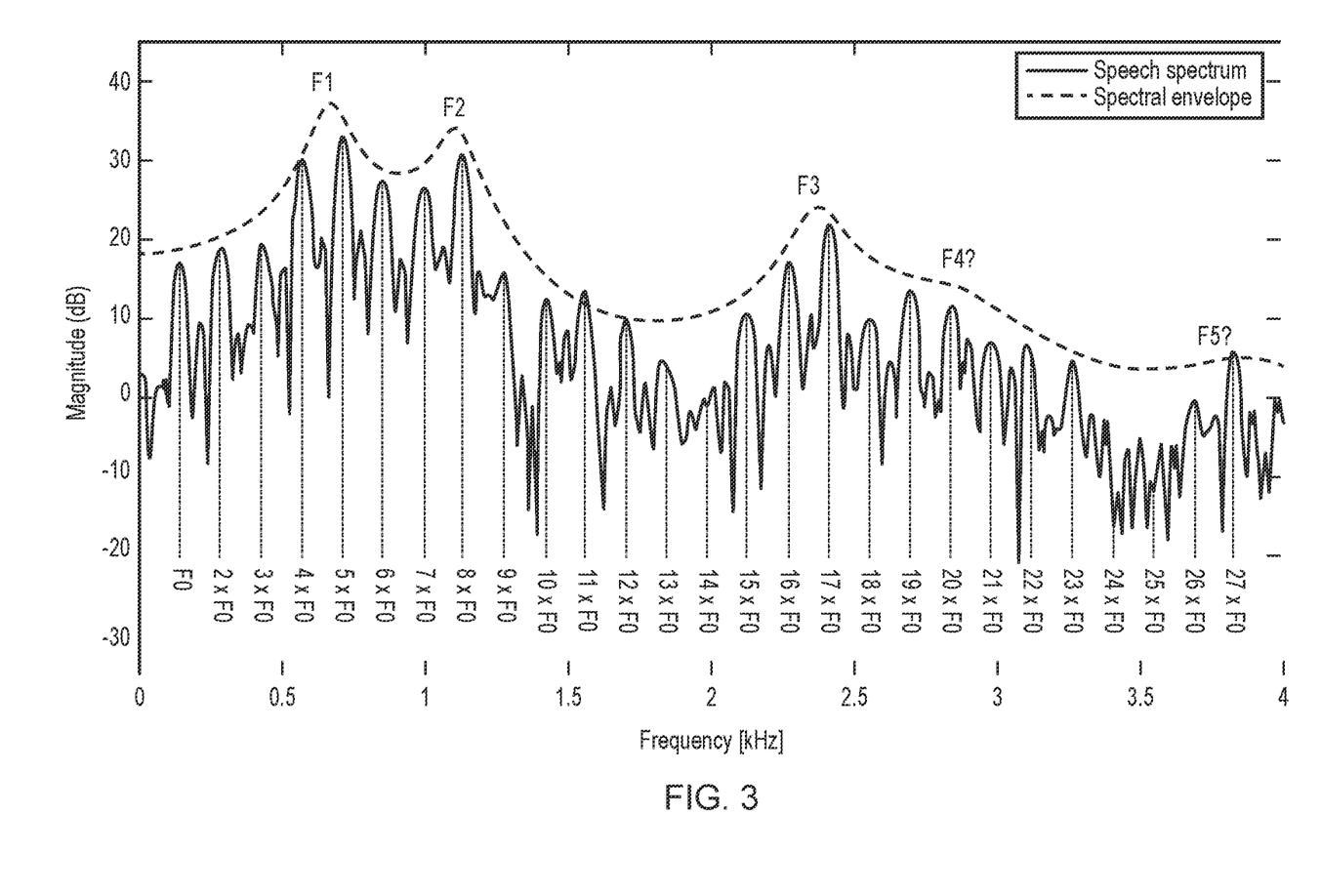
FIG. 3 is an exemplary illustration of a frequency spectrum of speech.

FIG. 3 illustrates the result of a frequency analysis of a stationary, voiced segment of speech. The frequency spectrum contains a comb-like structure at multiples of the fundamental frequency, F0, and wider and smoother hills caused by vocal tract resonances. By smoothing the frequency spectrum to find the spectral envelope, the fine-grained F0 features are decoupled from the large-scale, significant, formant features F1, F2, F3, F4, F5. Formants are used to distinguish vowel formants, but also conveys information about the physical speech apparatus, such as the pharynx, mouth and noise.

When formant locations are shifted in frequency, i.e. formant re-location, that is constant during a session for each speaker, relative formant location movement, i.e. frequency shift, is retained with the session, the likelihood that speech information is retained increases. At the same time, the frequency shift creates an artificial speech apparatus, different from the real physical speech apparatus. Since the artificial speech apparatus is different from the real speech apparatus, the voice of the speaker is anonymized. In this manner non-lingual information is kept while anonymizing the speaker. A problem with formant re-locations is that it can easily be inverted by a possible attacker with for access to the source code or the present patent application. In order solve this security problem, the applicant has realized that the formant re-location is performed by randomly picking a scaling factor for each session. In this manner, for each session, the frequency shift is different. Thus, an attacker wanting to invert the voice anonymization would have to either ad-hoc guessing the scaling factor for any given recording manually by ear or using technology like machine learning to estimate it. This raises the complexity and reduces the accuracy of an attack. The scaling factor is preferably selected within pre-determined ranges to maintain intelligibility of the speech. The selection of the scaling factor may be performed by using a random function to pick a number from two or more ranges of scaling factors.

Several methodologies may be used for formant re-location. The signal may be approximately inverse filtered, reducing the influence of the vocal tract, using Linear Prediction/Linear Predictive Coding (LPC), pole locations may be extracted and warped, then the filter can be re-applied with new pole locations. Alternatively, cepstral processing can be used to approximately separate the signal into excitation and vocal tract information where vocal tract information can be altered separately.

Figure 4:
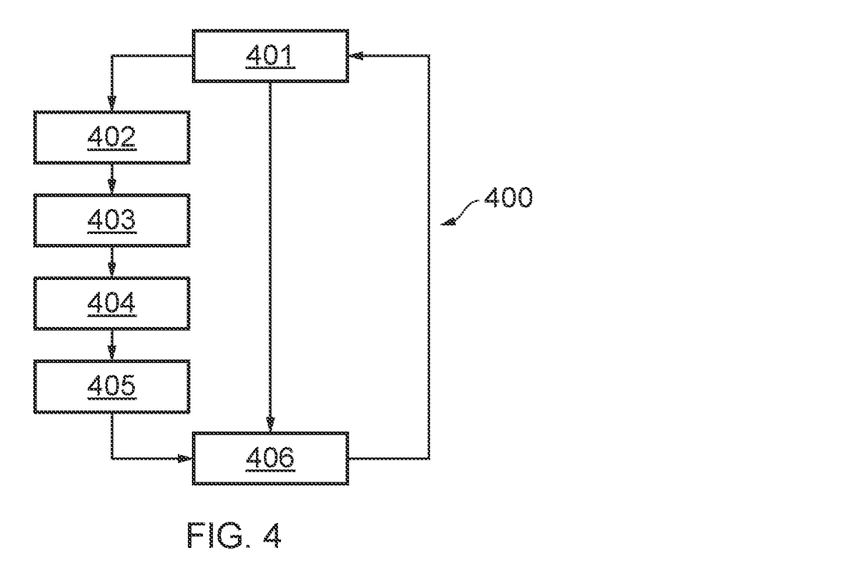
FIG. 4 is an exemplary flowchart illustrating an exemplary embodiment of the present invention.

FIG. 4 is a schematic illustration of an exemplary method 400 for anonymization in an audio- or videoconferencing session. The method is performed by an audio processing device. The audio processing device may be a specialized audio processing device or integrated in a general-purpose processing device. The audio processing device may be integrated in at least one of a multipoint conferencing node MCN 104 and a videoconferencing terminal 101*a*, 101*b*, 101*c*. The first step 401 comprises receiving a plurality of input audio samples comprising speech. The plurality of input audio samples may in one example be received from the videoconferencing terminals 101*a*, 101*b*, 101*c*. The next step 402 comprises calculating a frequency spectrum of each the plurality of input audio samples. Then in the next step 403 comprises calculating a smoothed spectral magnitude envelope of a first of the plurality of frequency spectrums to determine a plurality of formant features of the speech. Each of the plurality of formant features is located at different frequencies in the frequency spectrum. The next step 404 comprises determining one random scaling factor for the audio- or videoconferencing session. Using one scaling factor the entire audio- or videoconferencing session ensures that the formant re-location is constant during a session for each speaker such that the speech information is retained. The randomization of the scaling factor ensures that the formant re-location is random for each session. Then the next step 405 comprises determining, based on the one random scaling factor, a voice anonymization function shifting the formant location of at least one of the plurality of formants. The final step 406 comprises applying the voice anonymization function on the frequency spectrum of each the subsequent plurality of input audio samples in the audio- or videoconferencing session.

Figure 5:
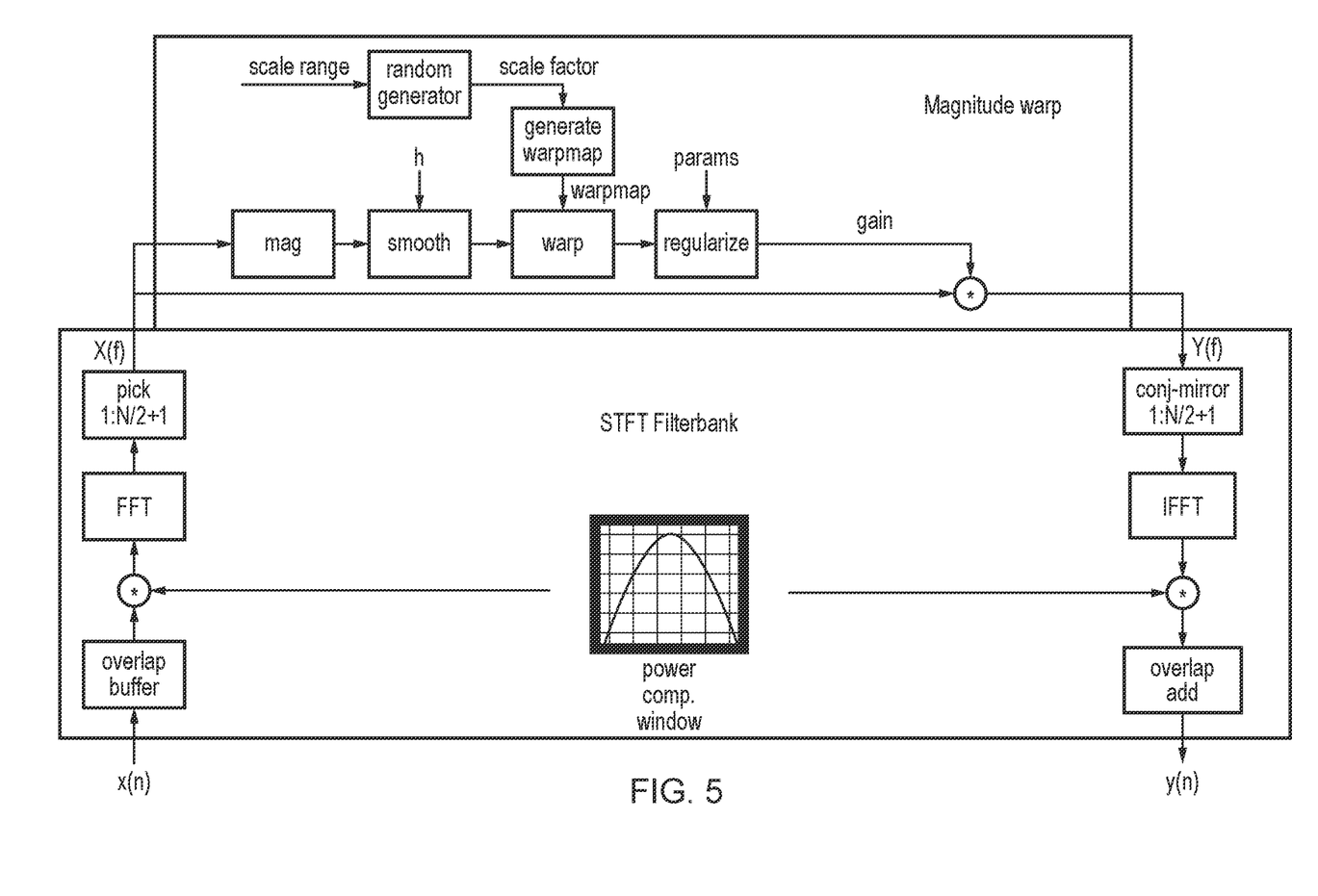
FIG. 5 is an exemplary flowchart illustrating an exemplary embodiment of the present invention.
Figure 6:
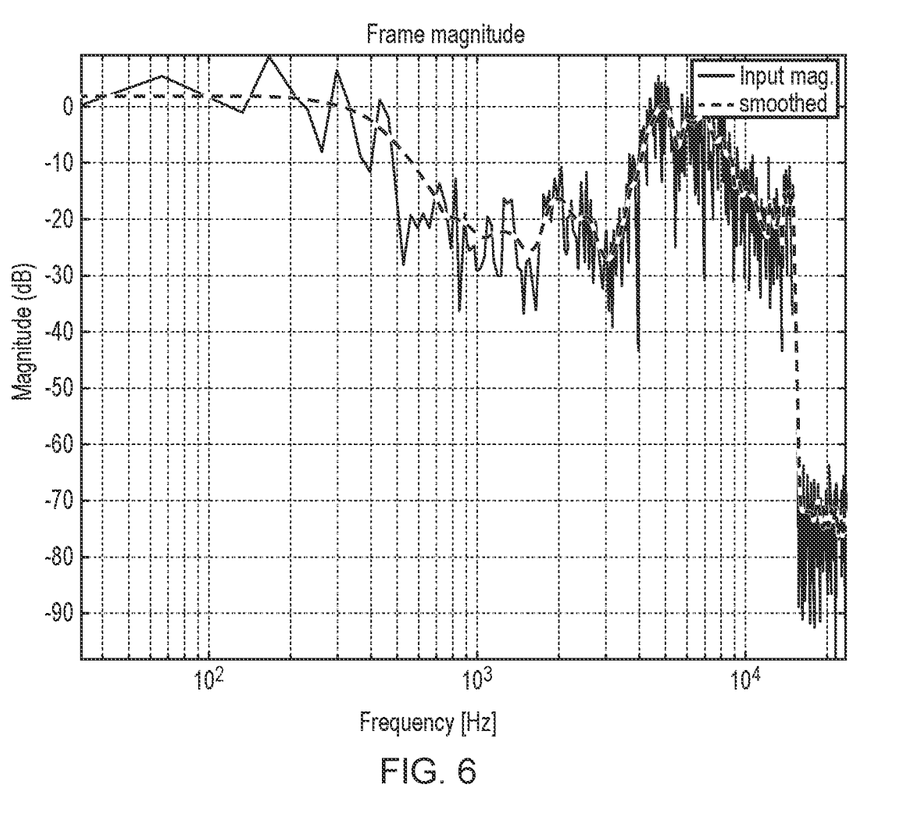
FIG. 6 illustrates a result of a smoothing function.

The method of the present invention combines a traditional analysis/synthesis filterbank with a piecewise linear frequency warping of a smoothed spectral magnitude envelope, where the degree of warping is randomized within two or more ranges of scaling factors. The method is schematically illustrated by the magnitude warp module of FIG. 5. The input audio samples x(n) are input to the analysis/synthesis filterbank. The filterbank calculates the frequency spectrum of each of the input audio samples, and outputs a frequency domain audio sample x(f), e.g. by performing a Fast Fourier transform (FFT) on the input audio samples x(n). The filterbank may preferably be a Short-Time Fourier Transform filterbank. The illustrated first step of the formant re-location is to calculate the complex magnitude of the frequency domain audio sample x(f). Then a smoothing function is applied on output of the complex magnitude calculation. The smoothing function may be a linear filter. FIG. 6 illustrates a result of a smoothing function on the input complex magnitude of the audio sample x(f).

Figure 7:
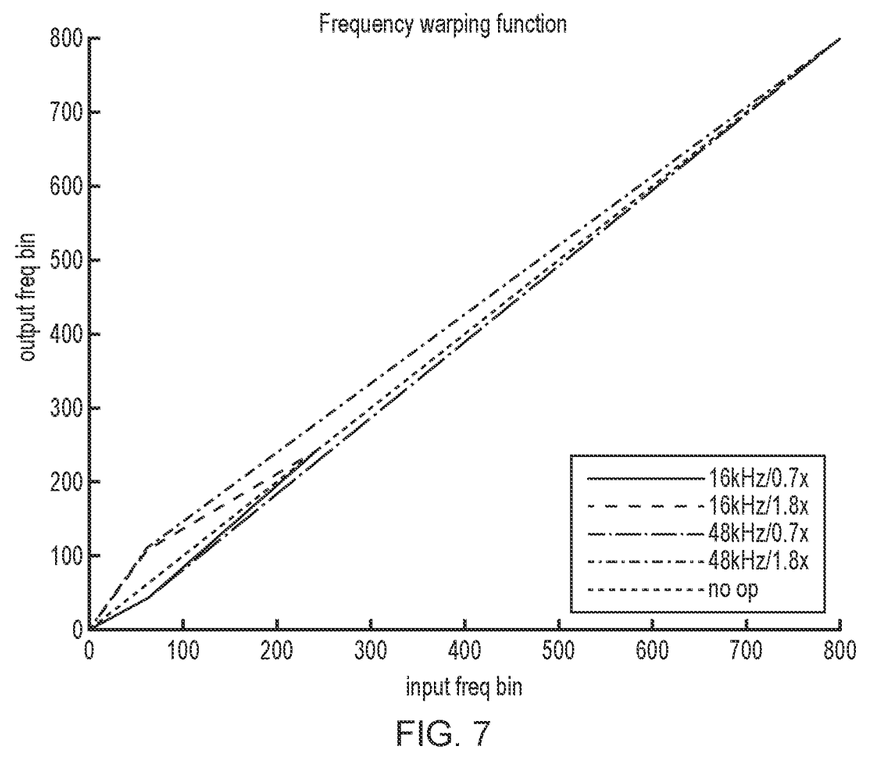
FIG. 7 illustrates exemplary voice anonymization functions.

The next step of the method is to apply the voice anonymization function, that in the illustrated method is a linear segment warping function, warpmap, that ensures linear scaling the main tonal range of 0-4 kHz. The warping function may taper off to zero warp at one half the sampling frequency. This ensures that the entire output spectrum will be non-zero, as long as the input contains energy in the appropriate range. This makes it harder to infer the warp function from a spectrogram of the audio sample. FIG. 7 illustrates four different frequency warping functions having different sampling frequencies, 16 kHz or 48 kHz, and different scaling factors, 0.7 or 1.8.

The warpmap is generated based on a scale factor that is input to a generate warpmap function. The scaling factor may be selected by inputting two or more ranges of scaling factors to a random number generator that picks a scaling factor from the two or more ranges of scaling factors.

Figure 8:
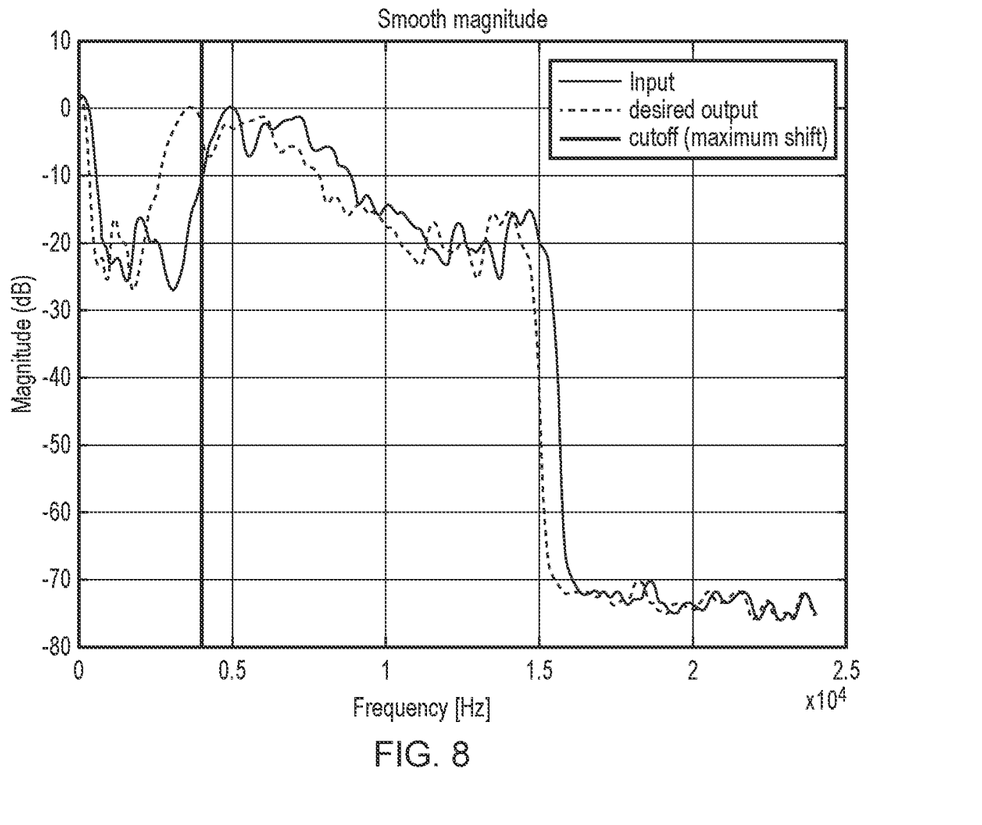
FIG. 8 illustrates exemplary input magnitude and desired output magnitude.
Figure 9:
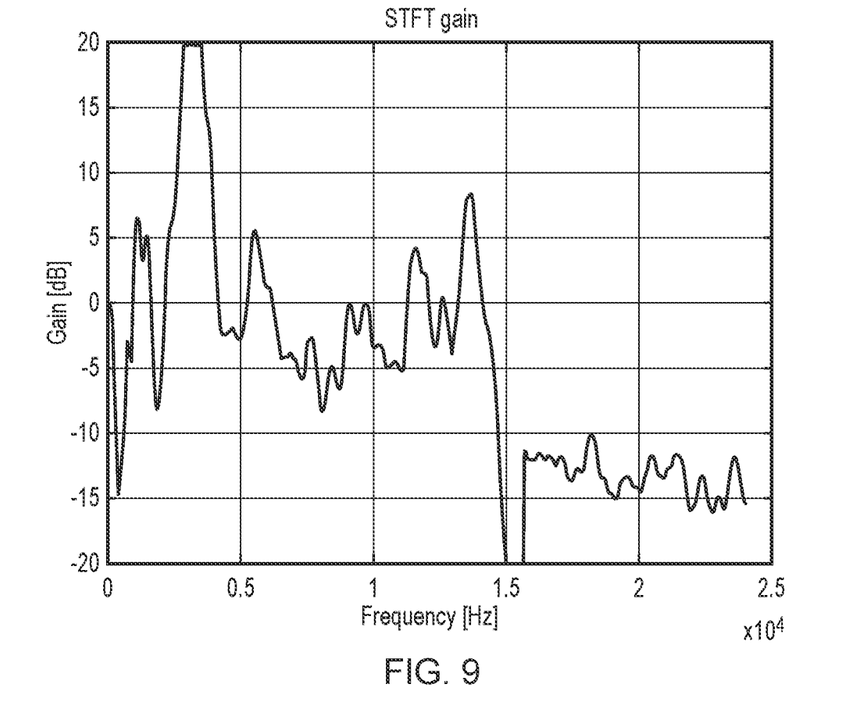
FIG. 9 illustrates exemplary determined frequency gains.

In the next step of the method, the regularization step, a plurality of frequency gains for the voice anonymization function is determined by calculating a ratio between the smoothed spectral magnitude envelope and a spectral magnitude envelope of the voice anonymization function applied on the smoothed spectral magnitude envelope. The spectral magnitude envelope of the voice anonymization function is the desired output magnitude. FIG. 8 illustrates the input magnitude and desired the output magnitude, and FIG. 9 illustrates the corresponding determined frequency gain.

In the next step of the method, the frequency gain is applied to the input frequency domain audio sample x(f), and the resulting output frequency domain audio sample y(f) is output to the analysis/synthesis filterbank. The analysis/synthesis filterbank performs a mirror-conjugate operation to produce a full frequency domain representation, and then performs an inverse FFT to output a processed audio sample y(n).

FIG. 5 is an exemplary schematic illustration of the invention where the analysis/synthesis filterbank is a standard 50% overlapped STFT (Short-Time Fourier Transform) filterbank using power complementary windowing. The unprocessed audio sample x(n) is input to the SFTF filterbank and the processed audio sample y(n) is output from the STFT filterbank after being modified by a magnitude warp module. The magnitude warp module may also be implemented with other analysis/synthesis filterbanks than the standard 50% overlapped STFT (Short-Time Fourier Transform) filterbank.

Figure 10:
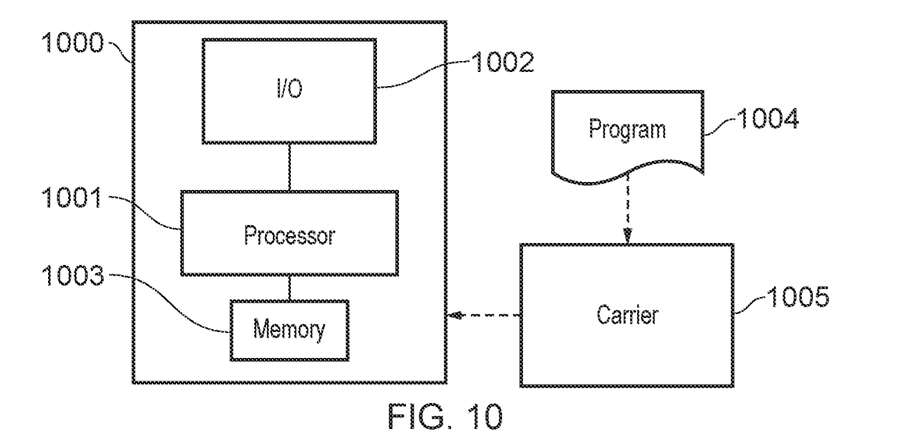
FIG. 10 schematically illustrates an exemplary audio processing device.

Turning now to FIG. 10, a schematically illustrated audio processing device 1000 is shown that is responsive to a program 1004 and carrier 1005. The audio processing device 1000 comprises an input/output circuitry 1002, at least one processor 1001 and a memory 1003. The memory 1003 contains instructions executable by the processor 1001, causing the audio processing device 1000 to:

receiving an plurality of input audio samples comprising speech;
calculating a frequency spectrum of each the plurality of input audio samples;
calculating a smoothed spectral magnitude envelope of a first of the plurality of frequency spectrums to determine a plurality of formant features of the speech, each of the plurality of formant features being located at different frequencies in the frequency spectrum;
determining one random scaling factor for the audio- or videoconferencing session;
determining, based on the one random scaling factor, a voice anonymization function shifting the formant location of at least one of the plurality of formants; and
applying the voice anonymization function on the frequency spectrum of each the subsequent plurality of input audio samples in the audio- or videoconferencing session.

In the preceding description, various aspects of the method and audio processing device according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the method and image processing device, which are apparent to persons skilled in the art to which the disclosed subject matter pertains, are deemed to lie within the scope of the present invention.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for voice anonymization in an audio- or videoconferencing session, the method comprising:
   receiving a plurality of input audio samples comprising speech;
   calculating a frequency spectrum of each the plurality of input audio samples;
   calculating a smoothed spectral magnitude envelope of a first of the plurality of frequency spectrums to determine a plurality of formant features of the speech, each of the plurality of formant features being located at different frequencies in the frequency spectrum;
   determining one random scaling factor for the audio- or videoconferencing session;
   determining, based on the one random scaling factor, a voice anonymization function shifting the formant location of at least one of the plurality of formants;
   applying the voice anonymization function on the frequency spectrum of each the subsequent plurality of input audio samples in the audio- or videoconferencing session;
   determining the one random scaling factor by using a random function to pick a number from two or more ranges of scaling factors;
   wherein the voice anonymization function is a linear segment warping function performing linear scaling in the range 0-4 kHz;
   the voice anonymization function is tapering off to zero warp at one half of a sampling frequency; and
   determining a plurality of frequency gains for the voice anonymization function by calculating a ratio between the smoothed spectral magnitude envelope and a spectral magnitude envelope of the voice anonymization function applied on the smoothed spectral magnitude envelope.

2. A method for voice anonymization in an audio- or videoconferencing session, the method comprising:
   receiving a plurality of input audio samples comprising speech;
   calculating a frequency spectrum of each the plurality of input audio samples;
   calculating a smoothed spectral magnitude envelope of a first of the plurality of frequency spectrums to determine a plurality of formant features of the speech, each of the plurality of formant features being located at different frequencies in the frequency spectrum;
   determining one random scaling factor for the audio- or videoconferencing session;
   determining, based on the one random scaling factor, a voice anonymization function shifting the formant location of at least one of the plurality of formants;
   applying the voice anonymization function on the frequency spectrum of each the subsequent plurality of input audio samples in the audio- or videoconferencing session; and
   determining a plurality of frequency gains for the voice anonymization function by calculating a ratio between the smoothed spectral magnitude envelope and a spectral magnitude envelope of the voice anonymization function applied on the smoothed spectral magnitude envelope.

3. The method of claim 2, wherein the calculating of the frequency spectrum of each of the plurality of input samples is performed by a filterbank.

4. The method of claim 3, wherein the filterbank is a Short-Time Fourier Transform filterbank.

5. An audio processing device for an audio- or videoconferencing session, the audio processing device:
   receiving a plurality of input audio samples comprising speech:
      calculating a frequency spectrum of each the plurality of input audio samples;
      calculating a smoothed spectral magnitude envelope of a first of the plurality of frequency spectrums to determine a plurality of formant features of the speech, each of the plurality of formant features being located at different frequencies in the frequency spectrum;
   determining one random scaling factor for the audio- or videoconferencing session;
   determining, based on the one random scaling factor, a voice anonymization function shifting the formant location of at least one of the plurality of formants;
   applying the voice anonymization function on the frequency spectrum of each the subsequent plurality of input audio samples in the audio- or videoconferencing session; and
   determining a plurality of frequency gains for the voice anonymization function by calculating a ratio between the smoothed spectral magnitude envelope and a spectral magnitude envelope of the voice anonymization function applied on the smoothed spectral magnitude envelope.

6. The audio processing device of claim 5, adapted to determining the one random scaling factor by using a random function to pick a number from two or more ranges of scaling factors.

7. The audio processing device of claim 5, wherein the voice anonymization function is a linear segment warping function performing linear scaling in the range 0-4 kHz.

8. The audio processing device of claim 7, wherein the voice anonymization function is tapering off to zero warp at one half of a sampling frequency.

9. The audio processing device of claim 5, comprising a filterbank calculating the frequency spectrum of each of the plurality of input samples.

10. The audio processing device of claim 9, wherein the filterbank is a Short-Time Fourier Transform filterbank.

11. The audio processing device of claim 10, wherein the audio processing device is integrated in at least one of a multipoint conferencing node, MCN, and a videoconferencing terminal.

* * * * *